US012766749B2

(12) United States Patent
Wang

(10) Patent No.: US 12,766,749 B2
(45) Date of Patent: Oct. 20, 2026

(54) METHOD OF MANUFACTURING A SHAVING RAZOR CARTRIDGE

(71) Applicant: The Gillette Company LLC, Boston, MA (US)

(72) Inventor: Ruike R. Wang, Lexington, MA (US)

(73) Assignee: The Gillette Company LLC, Boston, MA (US)

( * ) Notice: Subject to any disclaimer, the term of this patent is extended or adjusted under 35 U.S.C. 154(b) by 1008 days.

(21) Appl. No.: 17/549,068

(22) Filed: Dec. 13, 2021

(65) Prior Publication Data

US 2023/0182335 A1 Jun. 15, 2023

(51) Int. Cl.
*B26B 21/40* (2006.01)

(52) U.S. Cl.
CPC ...... *B26B 21/4075* (2013.01); *B26B 21/4018* (2013.01); *B26B 21/4025* (2013.01); *B26B 21/4031* (2013.01)

(58) Field of Classification Search
CPC ............ B26B 21/4075; B26B 21/4068; B26B 21/4031; B26B 21/4025; B26B 21/4018; B26B 21/4012
USPC ...................................................... 30/74.1, 32
See application file for complete search history.

(56) References Cited

U.S. PATENT DOCUMENTS 6,035,537 A * 3/2000 Apprille, Jr. ........ B26B 21/4068 30/346.5
2019/0299457 A1 10/2019 Long
2020/0316798 A1* 10/2020 Walker, Jr. ............ B26B 21/225

FOREIGN PATENT DOCUMENTS

WO 2015082002 A1 6/2015
WO 2020154920 A1 8/2020

OTHER PUBLICATIONS

PCT Search Report and Written Opinion for PCT/US2022/081141 dated Mar. 29, 2023, 10 pages.

* cited by examiner

*Primary Examiner* — Boyer D Ashley
*Assistant Examiner* — Robert D Cornett
(74) *Attorney, Agent, or Firm* — John M. Lipchitz

(57) ABSTRACT

A method of manufacturing a razor cartridge by molding a housing having a first mounting surface with a first notch extending into the housing to a first inner side wall. At least one blade is having a cutting edge is mounted to the housing. A first blade retention member is mounted over the cutting edge and on top of the first mounting surface. The first blade retention member is spaced apart from the first inner side wall by at least 0.25 mm.

17 Claims, 4 Drawing Sheets

METHOD OF MANUFACTURING A SHAVING RAZOR CARTRIDGE

FIELD OF THE INVENTION

The present invention relates to wet shaving safety razors and more particularly to shaving cartridges that have a housing with inspection areas for before and after the blades are secured to the housing.

BACKGROUND OF THE INVENTION

In general, a cartridge or blade unit of a safety razor has at least one blade with a cutting edge which is moved across the surface of the skin being shaved by means of a handle to which the cartridge is attached. Some shaving razors are provided with a spring biased cartridge that pivots relative to the handle to follow the contours of the skin during shaving. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled. Razor cartridges usually include a guard which contacts the skin in front of the blade(s) and a cap for contacting the skin behind the blade(s) during shaving. The cap and guard may aid in establishing the so-called "shaving geometry", i.e., the parameters which determine the blade orientation and position relative to the skin during shaving, which in turn have a strong influence on the shaving performance and efficacy of the razor. The cap may comprise a water leachable shaving aid to reduce drag and improve comfort. The guard may be generally rigid, for example formed integrally with a frame or platform structure which provides a support for the blades. Guards may also comprise softer elastomeric materials to improve skin stretching.

During the manufacturing of a typical shaving razor cartridge, blades are mounted within a plastic shaving cartridge housing. After the blades are properly mounted within the cartridge housing, a blade retaining member, such as a clip, is mounted over the blade and secured to the cartridge housing. The relative position of the blades (e.g., the shaving plane) is very important, as it is a determining factor in overall shaving performance. The shaving plane of the final assembled shaving cartridge may be impacted by the plastic shaving cartridge housing and/or the assembly process. For example, the injection molding process may create a distorted cartridge housing. Furthermore, the mounting of the blade retention member may distort the blade edges and/or the cartridge housing.

Accordingly, during inspection of final assembled cartridges it is difficult to determine the cause of an out of specification assembled cartridge. Thus, it would be advantageous to provide for a shaving razor cartridge and manufacturing process that addresses one or more of these issues.

SUMMARY OF THE INVENTION

In one aspect, the invention features, in general a method of manufacturing a razor cartridge by molding a housing having a first mounting surface with a first notch extending into the housing to a first inner side wall. At least one blade is having a cutting edge is mounted to the housing. A first blade retention member is mounted over the cutting edge and on top of the first mounting surface. The first blade retention member is spaced apart from the first inner side wall by at least 0.25 mm.

In another aspect, the invention features, in general a method of manufacturing a razor cartridge by molding a housing having a first mounting surface and a second mounting surface. At least one blade having a cutting edge is mounted to the housing. A first blade retention member is mounted over the cutting edge and on top of the first mounting surface. A second blade retention member is mounted over the cutting edge and on top of the second mounting surface. A first measurement is taken at a top surface of a first notch of the first mounting surface after mounting the first blade retention member. A second measurement is taken at a top surface of a second notch of the first mounting surface after mounting the first blade retention member. A third measurement is taken at a top surface of a third notch of the second mounting surface after mounting the second blade retention member. A fourth measurement is taken at a top surface of a fourth notch of the second mounting surface after mounting the second blade retention member. A plane is established based on the first, second, third and fourth measurements. The plane is compared to a predetermined plane value(s).

In another aspect, the invention features, in general a shaving razor cartridge with a housing having a first mounting surface with a first notch and a second notch extending to a respective first and second inner side walls, and a second mounting surface with a third notch and a fourth notch extending to a respective third and fourth inner side walls. The housing has a guard toward a front of the housing. The housing has a cap is toward a rear of the housing. At least one blade mounted to the housing. A first blade retention member is mounted over the at least one blade and on the first mounting surfaces. A second blade retention member is mounted over the at least one blade and on the second mounting surface. The first blade retention member is spaced apart from the first and second inner side walls by at least 0.25 mm.

BRIEF DESCRIPTION OF THE DRAWINGS

Other features and advantages of the present invention, as well as the invention itself, can be more fully understood from the following description of the various embodiments, when read together with the accompanying drawings, in which.

DETAILED DESCRIPTION OF THE INVENTION

Figure 1:
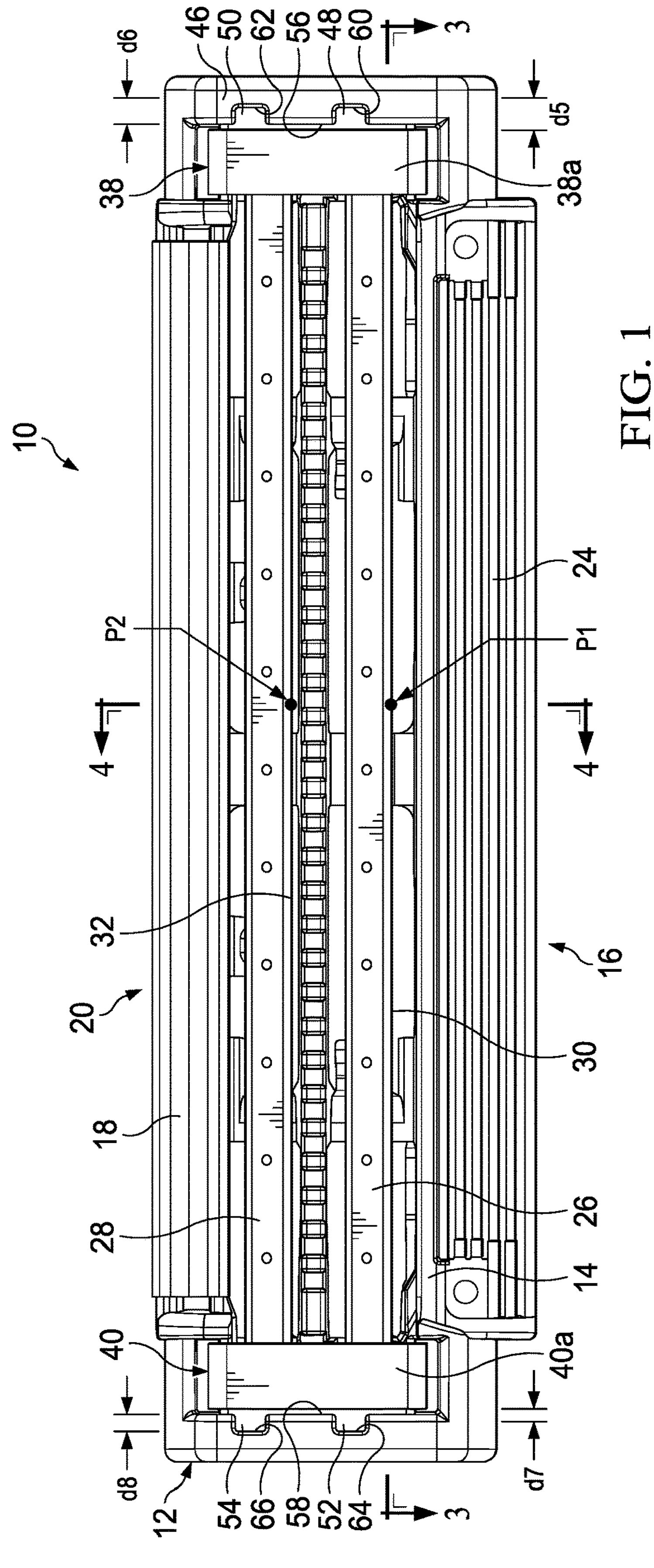
FIG. 1 is a perspective view of a shaving razor cartridge according to one possible embodiment of the present invention.

Referring to FIG. 1, a perspective view of a shaving razor cartridge 10 is illustrated. The shaving razor cartridge 10 may be removable or permanently mounted to a handle (not shown). For example, the shaving razor cartridge 10 may be mounted detachably on a handle to enable the shaving razor cartridge 10 to be replaced by a fresh shaving razor cartridge 10 when the blade sharpness has diminished to an unsatisfactory level, or it may be attached permanently to the handle with the intention that the entire razor be discarded when the blade or blades have become dulled. The shaving razor cartridge 10 may include a housing 12. The housing 12 may be molded out of a rigid plastic or manufactured from other materials, such as metal. A guard 14 may be positioned at a front portion 16 of the housing 14 and a cap 18 may be positioned at a rear portion 20 of the housing 12. The guard 14 may be a solid or segmented bar that supports the skin during a shaving stroke. The cap 18 may be mounted to the housing 12. In certain embodiments, the cap 18 may comprise one or more lubricants that are released during a shaving stroke. The guard 14 is typically a unitary molded member that can be formed of a rigid plastic (e.g., the same material as the housing 12). An elastomeric bar 24 may be positioned in front of the guard 14 to aid in stretching the skin during a shaving stroke (e.g., a plurality of fins or other protrusions). In certain embodiments, elastomeric bar 24 may be insert injection molded or co-injection molded to the housing 12. However, other known assembly methods may also be used such as adhesives, ultrasonic welding, or mechanical fasteners.

The elastomeric bar 24 may be molded from a softer material (i.e., lower durometer hardness) than the housing 12, such as an elastomer or silicone material.

Figure 2:
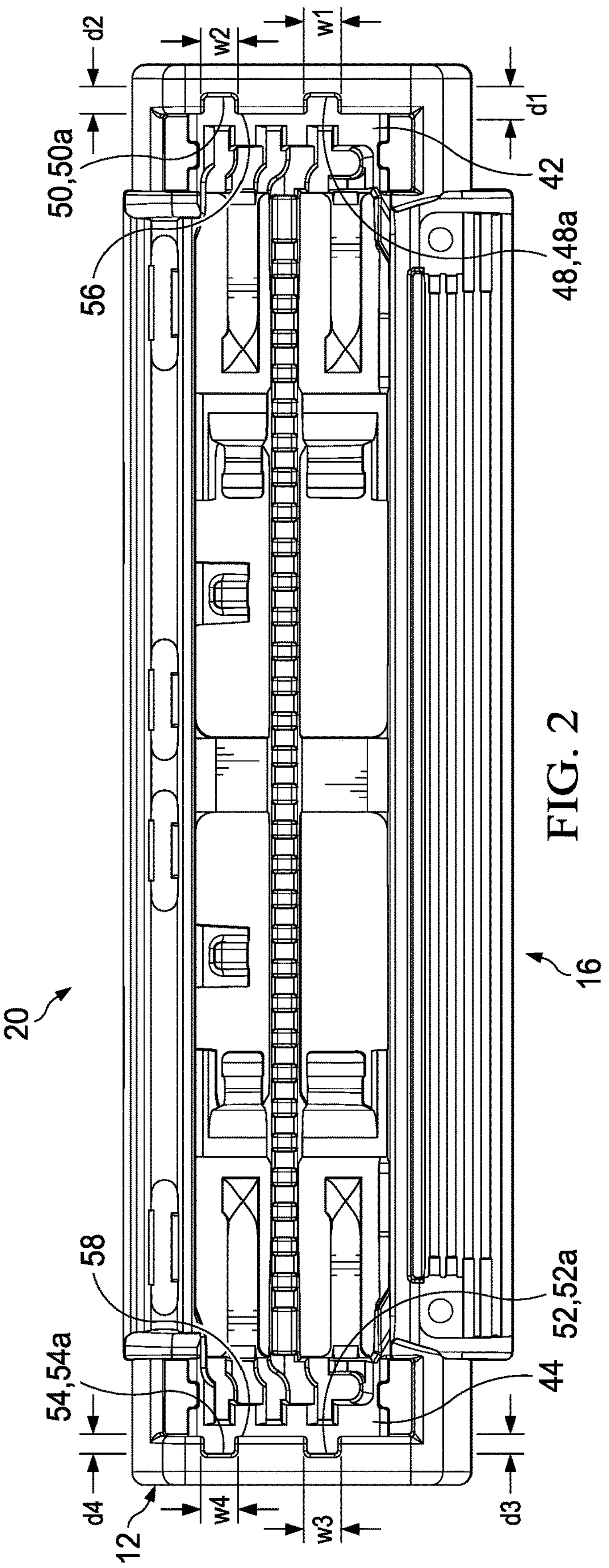
FIG. 2 is a top view of a housing of the shaving razor cartridge of FIG. 1.

One or more blades 26 and 28 may be mounted to the housing 12 between the cap 18 and the guard 14 (i.e., in front of the cap 18 and behind the guard 14). The blades 26 and 28 may each have a respective cutting edges 30 and 32 generally directed towards the guard 14. As will be explained in greater detail below, there may be one or more points P1 and P2 along the length of the respective the cutting edges 30 and 32 where various measurements may be taken. The guard 14 may extend generally parallel to one or more blades 26 and 28. In certain embodiments, the blades 26 and 28 may be mounted on a respective blade support member 34 and 36 (FIG. 2). Although two blades 26 and 28 shown, the housing 12 may have more or fewer blades depending on the desired performance and cost of the shaving razor cartridge 10. The blades 26 and 28 may be mounted to the housing 12 and secured in place by one or more blade retention members (e.g., clips) 38, 40. The blade retention members 38 and 40 may be secured to the housing 12 by staking or crimping. The blade retention members 38 and 40 may be located at opposite lateral sides of the housing 12. The blades 26 and 28 may be fixed in the housing 12 or may be resiliently mounted such that the blades 26 and 28 are biased against the blade retention members 38 and 40. The blade retention members 38 and 40 may aid in retaining the blades 26 and 28 in an up and down direction. In certain embodiments, one or more of the blade retention members 38 and 40 may extending into and/or through the housing 12. The blade retention members 38 and 40 may comprise a metal, such as aluminum or plastic. The blade retention members 38 and 40 may be spaced apart or alternatively may be interconnected to form a single structure.

Referring to FIG. 2, a top view of the housing 12 is illustrated. The housing 12 may be injection molded from one or more polymeric materials. The cap 18 (FIG. 1) may be extruded in a separate manufacturing operation and inserted into the slot 22 of the housing 12. Alternatively, the cap 18 may be molded as part of the housing 18. The molding process, as well as subsequent assembly operations may distort the housing 12, thus negatively impacting share performance. Accordingly, it may be important to take measurements of the housing 12, especially in areas near the blades 26 and 28, the guard 14 and/or the cap 18, both before and after subsequent assembly operations. For example, a measurement of the housing 12 may be taken after molding and the same measurement may be taken after final assembly of the shaving razor cartridge 10. The measurement of the housing 12 may be through in-line inspection or parts may be removed from the assembly process for measuring at a later time. One or more mounting surfaces 42 and 44 may be provided on the housing 12 to provide an area to mount the blade retention member 38 and 40. A top surface 46 of the housing 12 may define one or more notches 48 and 50 adjacent to the mounting surface 42 (i.e., the notches 48 and 50 may extend to the mounting surface 42). The top surface 46 of the housing 12 may define one or more notches 52 and 43 adjacent to the mounting surface 42 (i.e., the notches 48 and 50 may extend to the mounting surface 44). The notches 48 and 50 on the first mounting surface 42 may extend into an inner wall 56 of the housing 12 by a respective distance d1 and d2 of at least 0.25 mm (e.g., about 0.30 mm to 1.0 mm). Similarly, the notches 52 and 54 may extend into a second inner wall 58 by a respective distance d3 and d4 of at least 0.25 mm (e.g., about 0.30 mm to 1.0 mm). In certain embodiments, the notches 48 and 50 on the first mounting surface 42 may have a respective width "w1" and "w2" extending in a front to rear direction of about 0.75 mm to about 2.0 mm. Similarly, the notches 52 and 54 on the second mounting surface 44 may have a respective width "w3" and "w4" extending in a front to rear direction of about 0.75 mm to about 2.0 mm. In certain embodiments, the notches 48, 50, 52 and 54 may include generally rectangular or circular notches. Although two notches 48, 50, 52 and 54 are shown for each respective mounting surface 42 and 44, it is understood that more or less notches may be used depending on the size of the housing 12 and/or the number of blade mounted to the housing 12. The notches 48 and 52 may be positioned toward the front 16 of the housing 12. The notches 50 and 54 may be positioned toward the rear 20 of the housing 12. The notches 48 and 50 may be positioned on opposite lateral sides of the blade 26. The notches 50 and 54 may be positioned on opposite lateral sides of the blade 28. In certain embodiments, the notches 48 and 52 may be generally aligned (e.g., both positioned on a same line extending along the housing 12) with the blade 26. The notches 50 and 54 may be generally aligned (e.g., both positioned on a same line extending along the housing 12) with the blade 28. The location of the notches 48, 50, 52 and 54 may provide for measurements that are closer to the blades 26 and 28, thus providing measurements that may be more determinant of shaving performance.

Figure 3:
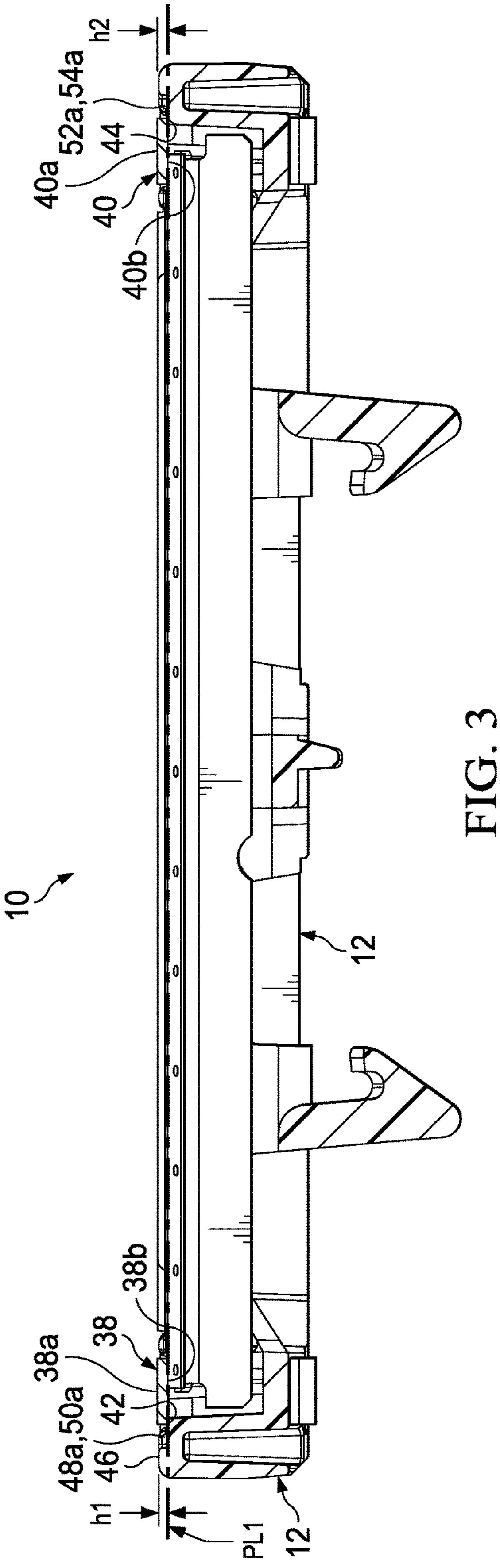
FIG. 3 is a cross section of the shaving razor cartridge, taken generally along the line 1-1 of FIG. 1.

As shown in FIG. 3, both the mounting surfaces 42 and 44 and the notches 48, 50, 52 and 54 may all be positioned on the same plane PL1 (e.g., the notches 48, 50 52, and 54 may establish the plane PL1). The mounting surfaces 42 and 44 may be flat and recessed relative to the top surface 46 of the housing 12. In certain embodiments, a height "h1" from the first mounting surface 42 (and a top surface of the notches 48*a* and 50*a*) to the top surface 38*a* of the blade retaining member 38 may be about 0.2 mm to about 0.4 mm. Similarly, a height "h2" from the second mounting surface 44 (and a top surface of the notches 52*a* and 54*a*) to the top surface 40*a* of the blade retaining member 40 may be about 0.2 mm to about 0.4 mm. In certain embodiments, the depth of the mounting surfaces 42 and 44 relative to the top surface 46 of the housing 12 may be about the same as a thickness of the blade retention members 38 and 40. Accordingly, the top surface 38*a* and 40*a* of the blade retention members 38 and 40 may be flush with the top surface 46 when the blade retention members 38 and 40 are mounted to the respective mounting surfaces 42 and 44. The bottom surface(s) 38*b* and 40*b* of the blade retention members 38 and 40 contact the cutting edges 30 and 32 of the blades 26 and 28 to establish the position of the cutting edges 30 and 32 relative to the housing 12 (e.g, the guard 14 and the cap 18), which impacts shave performance. The bottom surface 38*b* and 40*b* of the blade retention members 38 and 40 may also cover (e.g., contact) the respective mounting surfaces 42 and 44 of the housing 12, thus making it difficult to take measurements off the mounting surfaces 42 and 44.

Prior to assembly, the housing 12 may be measured. For example, the location of the top surfaces 48*a*, 50*a*, 52*a* and 54*b* may be measured to establish the plane PL1. The location of the top surfaces 48*a*, 50*a*, 52*a* and 54*b* may be also taken after assembly of the blade retention members 38 and 40 to the housing 12 to determine if the assembly process changed the values for the plane PL1 (e.g., distorted the shaving razor cartridge 10). The plane PL1 established after assembly of the blade retention members 38 and 40 to the housing 12 may be compared to the plane PL1 established prior to assembly of the blade retention members 38 and 40 to the housing 12 and/or may be compared to a predetermined value or range of value(s) (e.g., a plane value for a tolerance range representing a satisfactory level of distortion of the plane PL1). In certain embodiments, the assembly process may be adjusted depending on the measurements for the plane PL1 after assembly of the blade retention members 38 and 40 to the housing 12. The force applied to the blade retention members 38 and 40 when they are mounted to the housing 12 may cause distortion of the housing 12 resulting in the measurement values of the top surfaces 48*a*, 50*a*, 52*a* and 54*a* not to fall within an acceptable range (e.g., causing the plane PL1 to be distorted). However, the force applied to the blade retention members 38 and 40 as they are mounted to the housing 12 may be decreased. The measurement of the plane PL1 may be helpful to determine the force applied to the blade retention members 38 and 40 by gradually increasing the force until the plane PL1 becomes distorted outside of an acceptable range.

In certain embodiments, measurements may be taken from the top surface of the housing 12 to the top surface 48*a*, 50, 52*a*, 54*a* of the notches (e.g., height "h1"). These distances may be compared to each other to determine the level of distortion of the housing 12. After assembling the blades 26 and 28 and the blade retaining members 38 and 40 to the housing 12, the distance from the top surface of the housing to the top surface 48*a*, 50, 52*a*, 54*a* of the notches (e.g., height "h1") may be taken again to determine if the assembly process distorted the housing 12. In certain embodiments, a measurement may be taken at the top surface 48*a* of the first notch 48, a the top surface 50*a* of the second notch 50, at the top surface 52*a* of the third notch 52 and the top surface 54*a* of the fourth notch 54 to establish the plane "PL1".

It may be advantageous to measure the position of the mounting surfaces 42 and 44 relative to other areas of the housing 12, as well as other components of the shaving razor cartridge 10. However, after assembly, the mounting surfaces for current shaving razor cartridge housings are covered by the blade retention members (e.g., clips) such that measurements from the mounting surfaces of the housing cannot be taken after assembly. It may be important to measure the housing 12 (e.g., mounting surfaces 42 and 44) after assembly, because the assembly process may distort the housing 12 and/or other components relative to the housing 12, thus negatively impacting shaving performance. The notches 48, 50, 52 and 54 may provide a gap between the blade retention members 38 and 40 and the housing 12 that is sufficient to facilitate inspection and measurements of the shaving razor cartridge 10 after the blade retention members 38 and 40 have been mounted to the housing 12. For example, the notches 48, 50, 52 and 54 may be of sufficient size to allow for measurement with a standard gauge probe or OGP laser.

Figure 4:
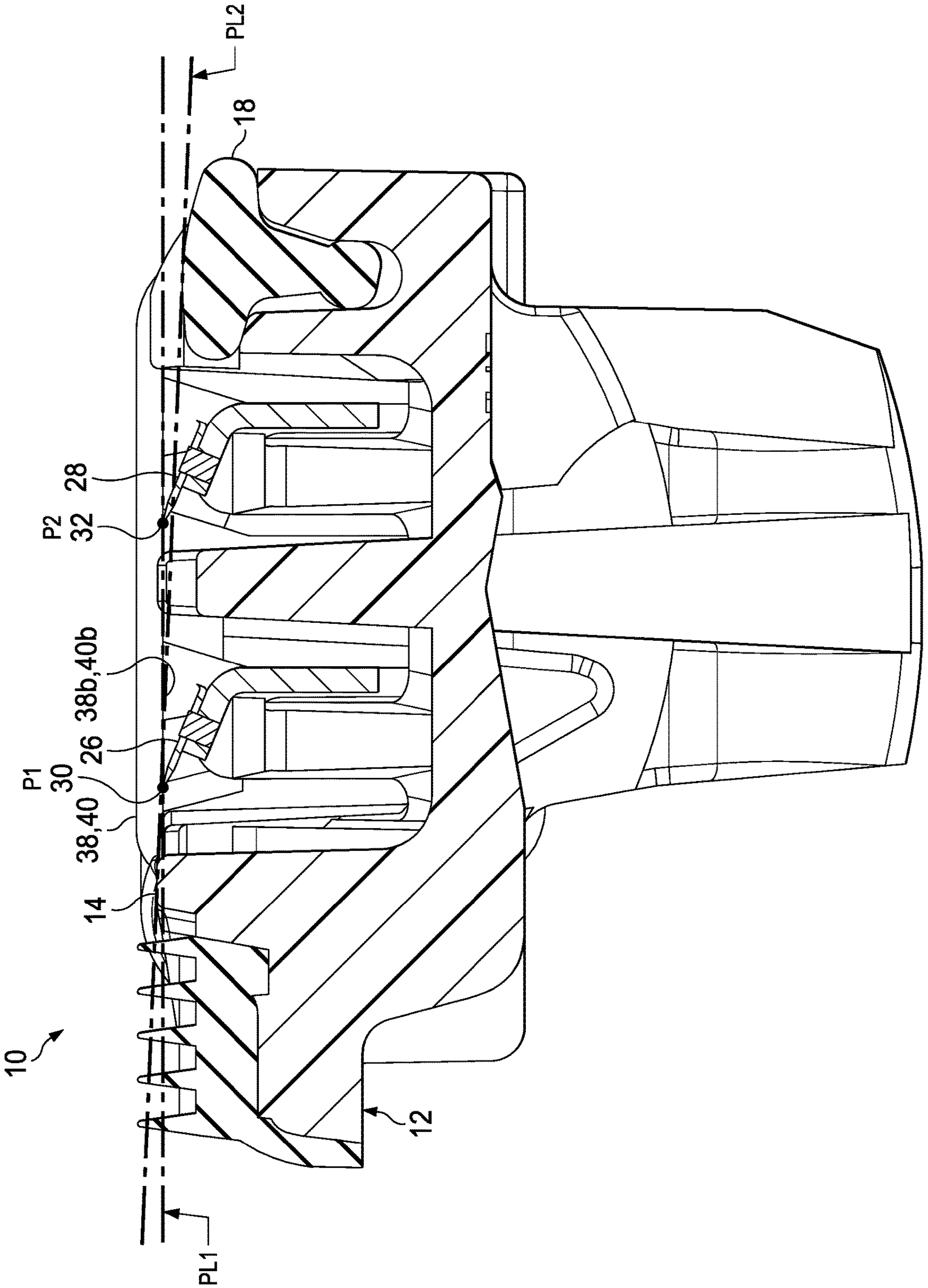
FIG. 4 is a cross section of the shaving razor cartridge, taken generally along the line 2-2 of FIG. 1.

Referring to FIG. 4, a cross section view of the shaving razor cartridge 10 is illustrated. After the housing 12 is molded, the blades 26 and 28 may be mounted to the housing 12. The blade retention members 38 and 40 may be mounted over the blades 26 and 28 such that the bottom surface 38*b* and 40*b* of the respective blade retention members 38 and 40 contacts the cutting edges 30 and 32 and the respective mounting surface 42 and 44 (FIG. 3) of the housing 12. The blade retention members 38 and 40 may be mounted over the cutting edges 32 and 34 to secure the blades 26 and 28 to the housing 12 and maintain the desired cartridge geometry (e.g., blade exposure). The exposure may be defined as the distance from one of the cutting edges 32 and 34 to a plane PL2 tangent to the guard 14 and the cap 18.

Referring back to FIG. 1, the notches 48, 50, 52 and 54 may allow for sufficient space between the blade retention members 38 and 40 and the housing for efficient and accurate measurements. For example, the first blade retention member 38 may be spaced apart from a first inner side wall 60 of the housing 12 defining the notch 48 by a distance d5 of at least of at least 0.25 mm (e.g., about 0.30 mm to 1.0 mm). The first blade retention member 38 may be spaced apart from a second inner side wall 62 defining the notch 48 by a distance d6 of at least of at least 0.25 mm (e.g., about 0.30 mm to 1.0 mm). The first inner wall 56 of the housing 12 may be positioned between the notches 48 and 50. The first inner wall 56 may be positioned closer to the blade retention member 38 than the first inner side wall 60 and the second inner side wall 62. The first inner wall 56 may facilitate proper positioning and securement of the blade retention member 38. Similarly, the second blade retention member 40 may be spaced apart from a third inner side wall 64 defining the notch 52 by a distance d7 of at least 0.25 mm (e.g., about 0.30 mm to 1.0 mm). The second blade retention member 40 may be spaced apart from a fourth inner side wall 66 defining the notch 54 by a distance d8 of at least of at least 0.25 mm (e.g., about 0.30 mm to 1.0 mm). The second inner wall 58 of the housing 12 may be positioned between the notches 52 and 54. The second inner wall 58 may be positioned closer to the blade retention member 40 than the third inner side wall 64 and the fourth inner side wall 66. The second inner wall 58 may facilitate proper positioning and securement of the blade retention member 40.

In certain embodiments, the plane PL1 may be established from taking the measurements at the top surfaces 48*a*, 50*a*, 52*a*, 54*a* of the notches 48, 50, 52 and 54 (FIG. 1). The plane PL1 may be established before and/or after the blade retention members 38 and 40 are mounted to the housing 12. It is understood that various measurements may be taken and stored on a computer, cloud, hard drive or other device for later reference. A distance may be measured from the points P1 and P2 along the respective cutting edges 30 and 32 to the established plabe PL1 to determine the shaving geometry of the shaving razor cartridge 10. The distance(s) from the points P1 and P2 to the established plane PL1 may be compared to pre-determined values (e.g., specification limits) to determine if the shaving razor cartridge 10 was properly assembled. Although only a single point P1 and P2 are shown along the respective cutting edges 30 and 32, it is understood that multiple points may be taken along each of the cutting edge 30 and 32 to obtain an even more accurate evaluation of the relative position of the cutting edges 30 and 32.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." The term "about" should be construed to be within typical manufacturing and measuring tolerances.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a razor cartridge comprising:

molding a housing having a first mounting surface, a first inner wall, and a first notch, the first notch extending into the first inner wall of the housing to a first inner side wall;

mounting at least one blade having a cutting edge to the housing;

mounting a first blade retention member over the cutting edge and on top of the first mounting surface; and spacing the first blade retention member apart from the first inner side wall by at least 0.25 mm.

2. The method of claim 1 further comprising taking a first measurement at a top surface of the first notch prior to mounting the first blade retention member.

3. The method of claim 1 further comprising taking a second measurement at a top surface of the first notch after mounting the first blade retention member.

4. The method of claim 1 further comprising taking a first measurement at a top surface of the first notch prior mounting the first blade retention member, taking a second measurement at the top surface of the first notch after mounting the first blade retention member and comparing the first measurement to the second measurement.

5. The method of claim 1 further comprising providing the first mounting surface with a second notch extending into the first inner wall of the housing to a second inner side wall and spacing the first blade retention member apart from the second inner side wall by at least 0.25 mm.

6. The method of claim 1 further comprising providing a third notch extending into a second inner wall of the housing to a third inner side wall and spacing a second blade retention member apart from the third inner side wall by at least 0.25 mm.

7. The method of claim 6 further comprising providing a fourth notch extending into the second inner wall of the housing to a fourth inner side wall and spacing a second blade retention member apart from the fourth inner side wall by at least 0.25 mm.

8. The method of claim 7 further comprising measuring a top surface of the first notch, a top surface of the second notch, a top surface of the third notch and a top surface of the fourth notch to establish a plane after to mounting either the first or second blade retention members.

9. The method of claim 8 further comprising measuring a distance from the plane to at least one point along the cutting edge of the at least one blade.

10. The method of claim 9 further comprising comparing the plane established prior to mounting the first and second blade retention members to the plane established after mounting the blade retention members.

11. A shaving razor cartridge comprising:

a housing comprising;

a first mounting surface; a first inner wall; a first notch extending into the first inner wall of the housing to a first inner side wall; a second notch extending into the first inner wall of the housing to a second inner side wall;

a second mounting surface; a second inner wall; a third notch extending into the second inner wall of the housing to a third inner side wall; a fourth notch extending into the second inner wall of the housing to a fourth inner side wall;

a guard toward a front of the housing;

a cap toward a rear of the housing;

at least one blade mounted to the housing;

a first blade retention member mounted over the at least one blade and on the first mounting surfaces;

a second blade retention member mounted over the at least one blade and on the second mounting surface, wherein the first blade retention member is spaced apart from the first and second inner side walls by at least 0.25 mm.

12. The shaving razor cartridge of claim 11 wherein the first blade retention member is spaced apart from the first and second inner side walls by 0.30 mm to 1.0 mm.

13. The shaving razor cartridge of claim 11 wherein the second blade retention member is spaced apart from the third and fourth inner side walls by 0.30 mm to 1.0 mm.

14. The shaving razor cartridge of claim 11 wherein the first and third notches are at opposing lateral ends of the at least one blade.

15. The shaving razor cartridge of claim 11 wherein a top surface of the first notch and a top surface of the second notch are recessed relative to a top surface of the housing by 0.2 mm to 0.4 mm.

16. The shaving razor of claim 11 wherein the first notch and the second notch have a width extending in a front to rear direction of 0.75 mm to 2.0 mm.

17. The shaving razor cartridge of claim 11 wherein the first blade retention member does not cover a top surface of the first notch and a top surface of the second notch.

* * * * *